United States Patent
Kojima (10) Patent No.: US 12,277,355 B2
(45) Date of Patent: Apr. 15, 2025

(54) COMMUNICATION APPARATUS THAT REGULATES USE OF A SPECIFIC FUNCTION WHEN A PROGRAM UPDATE IS NOT EXECUTED, CONTROL METHOD, AND STORAGE MEDIUM

(71) Applicant: CANON KABUSHIKI KAISHA, Tokyo (JP)

(72) Inventor: Ryoko Kojima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/539,421

(22) Filed: Dec. 14, 2023

(65) Prior Publication Data

US 2024/0256196 A1    Aug. 1, 2024

(30) Foreign Application Priority Data

Jan. 30, 2023  (JP) ................................ 2023-012000

(51) Int. Cl.
  *G06F 3/12*   (2006.01)
(52) U.S. Cl.
  CPC .......... *G06F 3/1225* (2013.01); *G06F 3/1204* (2013.01); *G06F 3/121* (2013.01); *G06F 3/1234* (2013.01); *G06F 3/1285* (2013.01)

(58) Field of Classification Search
  CPC ...... G06F 3/1225; G06F 3/1204; G06F 3/121; G06F 3/1234; G06F 3/1285
  USPC ................................................ 358/1.14, 1.15
  See application file for complete search history.

(56) References Cited

U.S. PATENT DOCUMENTS

| | | | |
|---|---|---|---|
| 11,188,278 B2 | 11/2021 | Sone | |
| 2020/0310707 A1* | 10/2020 | Sone | ......................... G06F 8/65 |
| 2020/0366806 A1* | 11/2020 | Asai | ......................... H04L 67/34 |

\* cited by examiner

*Primary Examiner* — Kent Yip
(74) *Attorney, Agent, or Firm* — Venable LLP (57) ABSTRACT

There is provided a technique capable of updating a program without decreasing user convenience regardless of whether a service is subscribed. A communication apparatus capable of providing a function based on a service according to an agreement includes an acquisition unit which acquires, from a server, first update information about a first update to correct an error relevant to the service and second update information about a second update to correct an error irrelevant to the service, and a regulation unit which regulates use of the function provided by the service in a case where the first update is not executed based on the first update information. The regulation unit does not regulate the use of the function provided by the service in a case where the second update is not executed based on the second update information.

12 Claims, 7 Drawing Sheets

COMMUNICATION APPARATUS THAT REGULATES USE OF A SPECIFIC FUNCTION WHEN A PROGRAM UPDATE IS NOT EXECUTED, CONTROL METHOD, AND STORAGE MEDIUM

BACKGROUND OF THE INVENTION

Field of the Invention

The present invention relates to a communication apparatus, control method, and storage medium capable of providing a function according to a service under an agreement.

Description of the Related Art

There has been conventionally known a subscription service in which a printing apparatus used for printing and a consumable in that printing apparatus can be used at a fixed price for each certain period. In such a subscription service, since the printing apparatus and the consumable are prepared by a service provider, a used can get an environment for printing only by making an agreement.

If it is found that a program of the printing apparatus has an error that inhibits the subscription service from functioning normally, the service provider should prepare update data for the program of the printing apparatus and prompt a user to execute an update to correct the error using the update data. Since a program update is generally not compulsory, a user may continue to use the program including the error without performing the update. To avoid such a use, U.S. Pat. No. 11,188,278 discloses a technique of providing the update data with prohibited-function information and thereby regulating a function designated by the prohibited-function information until the program is updated.

In the technique of U.S. Pat. No. 11,188,278, however, if the update is not executed, the regulation of the function according to the update is also applied to a printing apparatus of a user who does not subscribe the subscription service in a group of printing apparatuses managed by a service system provided by the service provider. This decreases user convenience.

SUMMARY OF THE INVENTION

The present invention has been accomplished in view of the above problem and provides a technique capable of updating a program without decreasing user convenience regardless of whether a service is subscribed.

In the first aspect of the present invention, there is provided a communication apparatus capable of providing a function based on a service according to an agreement, the communication apparatus including:
  an acquisition unit configured to acquire, from a server, first update information about a first update to correct an error relevant to the service and second update information about a second update to correct an error irrelevant to the service; and
  a regulation unit configured to regulate use of the function provided by the service in a case where the first update is not executed based on the first update information,
  wherein the regulation unit does not regulate the use of the function provided by the service in a case where the second update is not executed based on the second update information.

In the second aspect of the present invention, there is provided a control method of a communication apparatus capable of providing a function based on a service according to an agreement, the control method including:
  an acquisition step of acquiring, from a server, first update information about a first update to correct an error relevant to the service and second update information about a second update to correct an error irrelevant to the service; and
  a regulation step of regulating use of the function provided by the service in a case where the first update is not executed based on the first update information,
  wherein in the regulation step, the use of the function provided by the service is not regulated in a case where the second update is not executed based on the second update information.

In the third aspect of the present invention, there is provided a non-transitory computer readable storage medium storing a program for causing a computer to perform a control method of a communication apparatus, the control method including:
  an acquisition step of acquiring, from a server, first update information about a first update to correct an error relevant to the service and second update information about a second update to correct an error irrelevant to the service; and
  a regulation step of regulating use of the function provided by the service in a case where the first update is not executed based on the first update information,
  wherein in the regulation step, the use of the function provided by the service is not regulated in a case where the second update is not executed based on the second update information.

According to the present invention, a program update can be performed without decreasing user convenience regardless of whether a service is subscribed.

Further features of the present invention will become apparent from the following description of exemplary embodiments with reference to the attached drawings.

DESCRIPTION OF THE EMBODIMENTS

An example of embodiments of a communication apparatus, control method, and storage medium will be described below in detail with reference to the accompanying drawings. It should be noted that the following embodiments do not limit the present invention and not all of the combinations of features explained in the embodiments are necessarily essential for solving the problem of the present invention. The positions, shapes, and the like of constituent elements described in the embodiments are merely shown as examples and the scope of this invention is not limited to these examples.

First Embodiment

First, an example of a printing apparatus according to a first embodiment will be described with reference to FIGS. 1 to 4.

Configuration of Printing System

Figure 1:
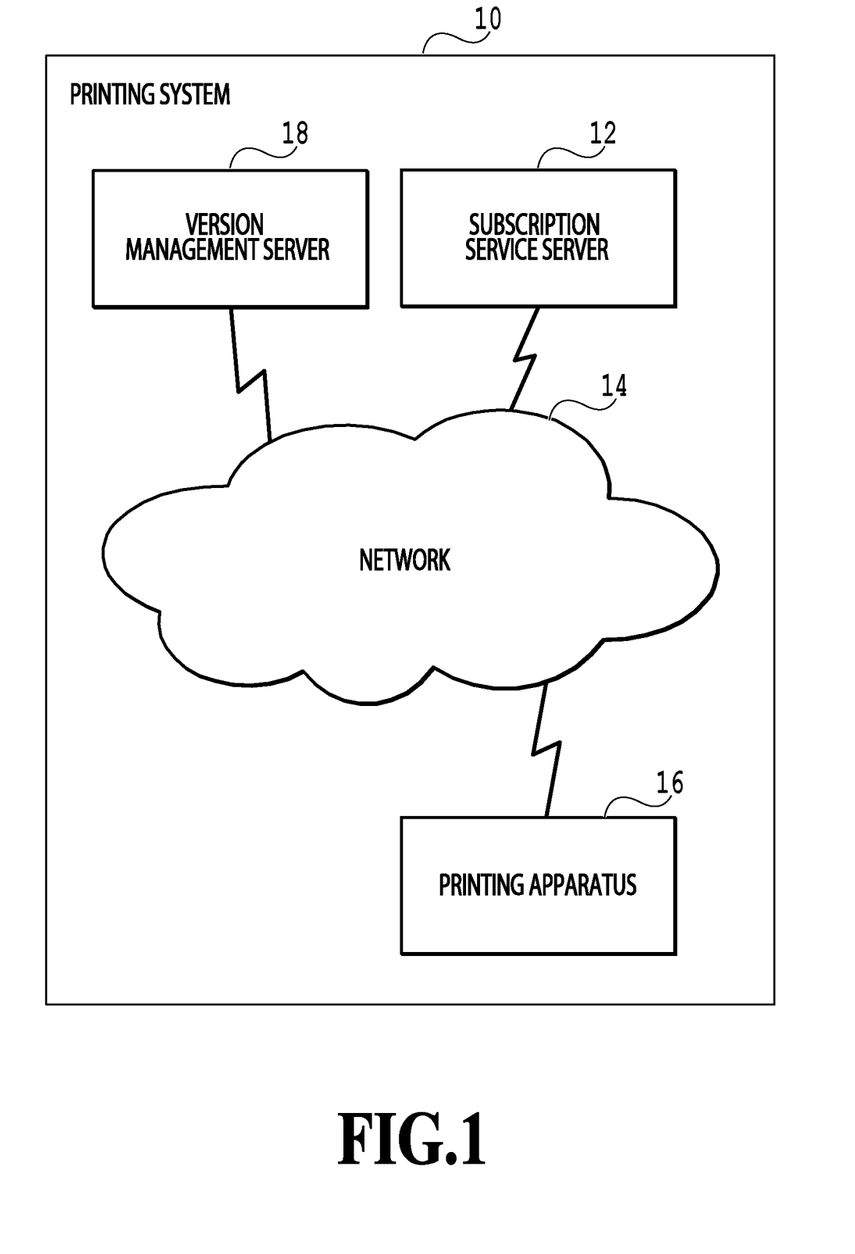
FIG. 1 is a schematic configuration diagram of a printing system.

FIG. 1 is a schematic configuration diagram of a printing system comprising a printing apparatus according to the present embodiment. A printing system 10 of FIG. 1 comprises a subscription service server 12 which manages the use of a printing apparatus 16 (described later) of a user who subscribes a subscription service and the printing apparatus 16 connected to the subscription service server 12 via a network 14. The printing system 10 also comprises a version management server 18 which manages a program operating in the printing apparatus 16, and more specifically, manages update data of the program and version information of the program.

In the present embodiment, a printing apparatus which performs printing on a print medium is described as an example of the printing apparatus 16. However, the printing apparatus 16 is not limited to this and may be a multi-function peripheral (MFP) which has at least one of publicly-known functions such as the reading, copying, and facsimile functions in addition to the printing function. Further, although only one printing apparatus 16 is shown in the printing system 10 of FIG. 1 for ease of understanding, the printing system 10 actually has a plurality of printing apparatuses 16 connected to the subscription service server 12 and the version management server 18 via the network 14.

Configurations of Servers and Printing Apparatus

Figure 2A:
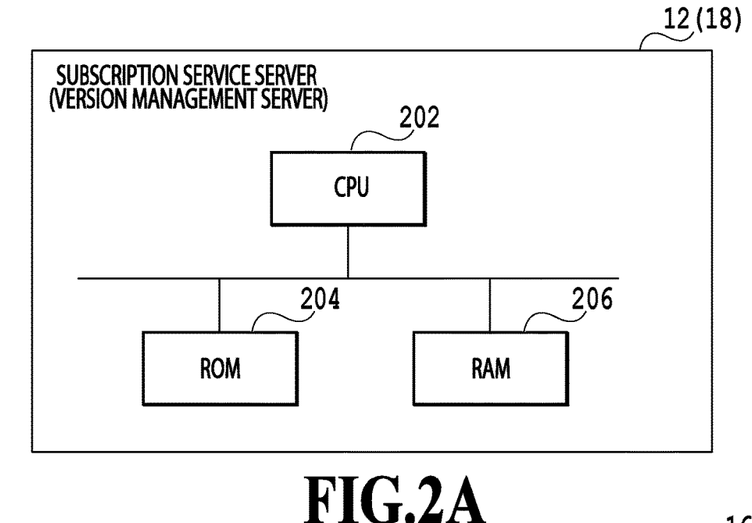
FIGS. 2A and 2B are block diagrams showing configurations of control systems of servers and a printing apparatus.
Figure 2B:
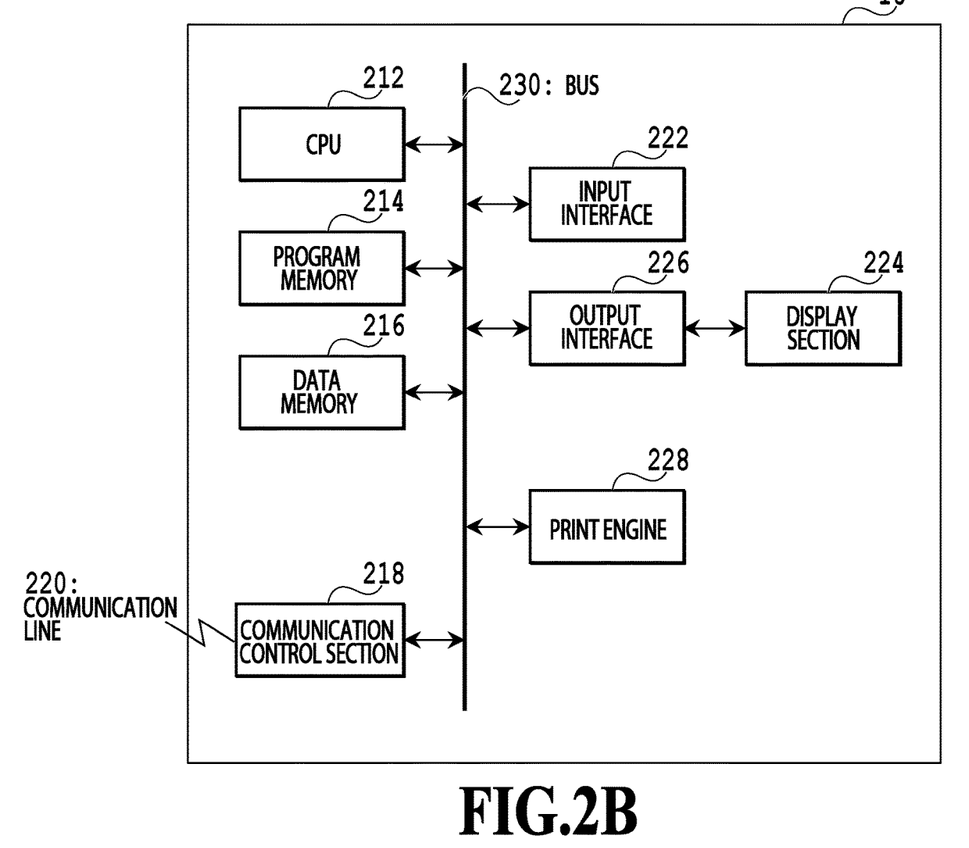

Next, the subscription service server 12, version management server 18, and printing apparatus 16 provided in the printing system 10 will be described. FIG. 2A is a block diagram showing a configuration of a control system of the subscription service server 12 and version management server 18 and FIG. 2B is a block diagram showing a configuration of a control system of the printing apparatus 16.

Subscription Service Server and Version Management Server

Each of the subscription service server 12 and the version management server 18 comprises a CPU 202 which controls the server and a ROM 204 which stores a control program and the like executed by the CPU 202 (see FIG. 2A). Each of the subscription service server 12 and the version management server 18 also comprises a RAM 206 which stores various kinds of information and functions as a work area of the CPU 202.

The subscription service server 12 acquires a usage status of the printing apparatus 16 used by a user who subscribes the subscription service based on information output from the printing apparatus 16 and controls the printing apparatus 16 and regulates the function of the printing apparatus 16 according to the usage status and the content of the subscription service. Incidentally, the detailed description of the technique of regulating the function of the printing apparatus 16 by the subscription service server 12 will be omitted because a publicly-known technique can be applied.

The version management server 18 also stores information for updates such as error correction, function enhancement, and function correction in the provided subscription service for the program in the printing apparatus 16. More specifically, the version management server 18 stores update data for updating the program of the printing apparatus 16, version information updated by the updating, and the like.

Printing Apparatus

The printing apparatus 16 comprises a CPU 212 which is a system control section and controls operation of the entire printing apparatus 16 and a program memory 214 which stores a control program, embedded operating system program, and the like executed by the CPU 212 (see FIG. 2B). The printing apparatus 16 also comprises a data memory 216 which stores a program control variable and the like and has various work buffer areas for use in processing of a print engine 228 and a communication control section 218 which controls data transmission to and reception from the outside via a communication line 220.

The printing apparatus 16 comprises an input interface 222 which receives a data input and operation instruction from a user. The input interface 222 is formed by at least one of a keyboard, button, touch panel, and the like. The printing apparatus 16 also comprises an output interface 226 which performs control to display data and notify a status of the printing apparatus 16 in a display section 224. Incidentally, the input interface 222 and the output interface 226 may be integrated into a single feature which outputs a screen and receives a user operation. The display section 224 is formed by a light-emitting diode (LED), liquid-crystal display (LCD), or the like and configured to display data and notify a user of a status of the printing apparatus 16. Incidentally, the display section 224 may have a software keyboard with keys such as a numerical value input key, mode setting key, enter key, delete key, and power key so that an input is received from a user via the display section 224.

The printing apparatus 16 comprises the print engine 228 which forms an image on a print medium such as paper and outputs a printing result using a printing material such as ink based on information stored in the data memory 216 and a received job. The CPU 212, program memory 214, data memory 216, communication control section 218, input interface 222, output interface 226, and print engine 228 are connected to each other via a bus 230.

Summary of Subscription Service

With the above configuration, a service provider provides a subscription service in which the printing apparatus 16 can be used at a fixed price for a certain period by the printing system 10. Incidentally, the subscription service server 12 and the version management server 18 are managed by the service provider. The subscription service is, for example, a service in which a user can use the printing apparatus 16 for printing up to a certain number of sheets by paying a fee for a monthly plan for which a monthly fee is set. In a case where the certain number is exceeded, for example, a user may change the plan to a higher one or may be charged an additional fee for each sheet on an as-used basis.

In a case where a user applies for the subscription service of the service provider, the service provider concludes an agreement about the subscription service with the user and delivers a consumable such as ink and the printing apparatus 16 to the user after the conclusion. At a timing such as initialization by the user who has applied for the subscription service, the printing apparatus 16 receives subscription service sign-up information indicating that the user subscribes the subscription service from the subscription service server 12 via the communication line 220 and the network 14. The printing apparatus 16 then performs printing according to a job generated by the user. In a case where the printing apparatus 16 performs printing based on the job, the CPU 212 generates a job log including, for example, the number of sheets printed by the job and the amount of the consumable consumed by the printing and transmits the generated job log to the subscription service server 12. Based on the information in the job log, the subscription service server 12 calculates the number of sheets printed per month and the rate of consumption of the consumable in the printing apparatus 16. Based on the calculated rate of consumption, arrangements are made for delivery of the consumable, for example, at the timing when the remaining amount of the consumable in the printing apparatus 16 becomes equal to or less than a predetermined amount. In addition, the subscription service server 12 checks the usage status of the printing apparatus 16 based on the information in the job log and, for example, in a case where the number of sheets printed reaches a certain number, regulates the use of the function of the printing apparatus 16.

As described above, the subscription service of the present embodiment requires the maintenance of an environment in which the printing apparatus 16 is connected to the network 14 in the printing system 10 and the job log is periodically transmitted to the subscription service server 12. Thus, the printing system 10 is configured such that the use of the function of the printing apparatus 16 is stopped while the printing apparatus 16 is not connected to the network 14.

Further, the printing system 10 is also connected to the printing apparatus 16 used by a user who does not subscribe the subscription service as well as the printing apparatus 16 used by a user who subscribes the subscription service. Accordingly, in the printing system 10, the version management server 18 manages update data for updating both of the programs of the printing apparatus 16 of a user who subscribes the subscription service and the printing apparatus 16 of a user who does not subscribe the subscription service.

Management Process

Figures 3, 3A:
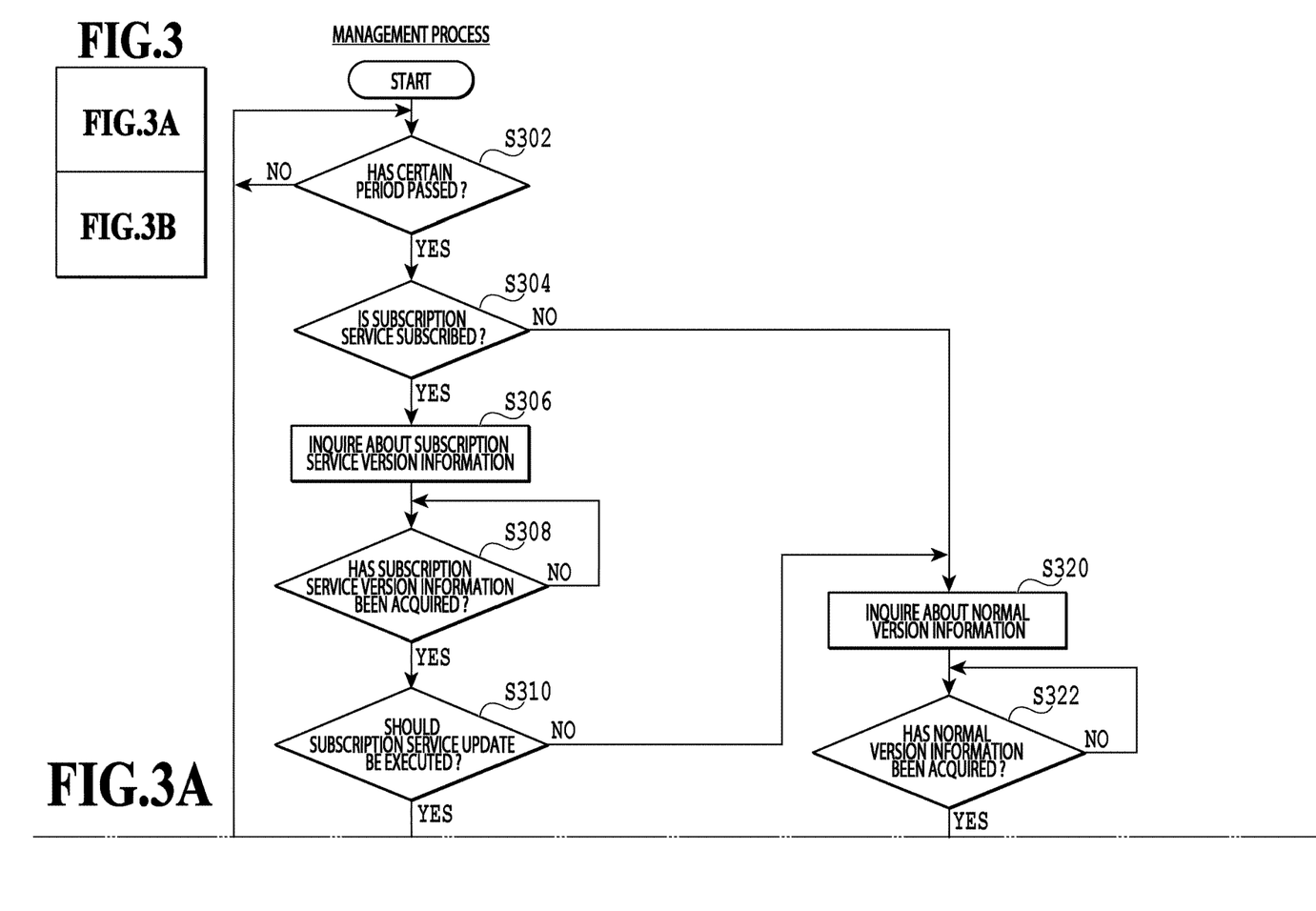
FIG. 3 is a diagram showing a relation between FIGS. 3A and 3B.
FIGS. 3A and 3B are flowcharts showing a processing routine of a management process in a first embodiment.
Figure 3B:
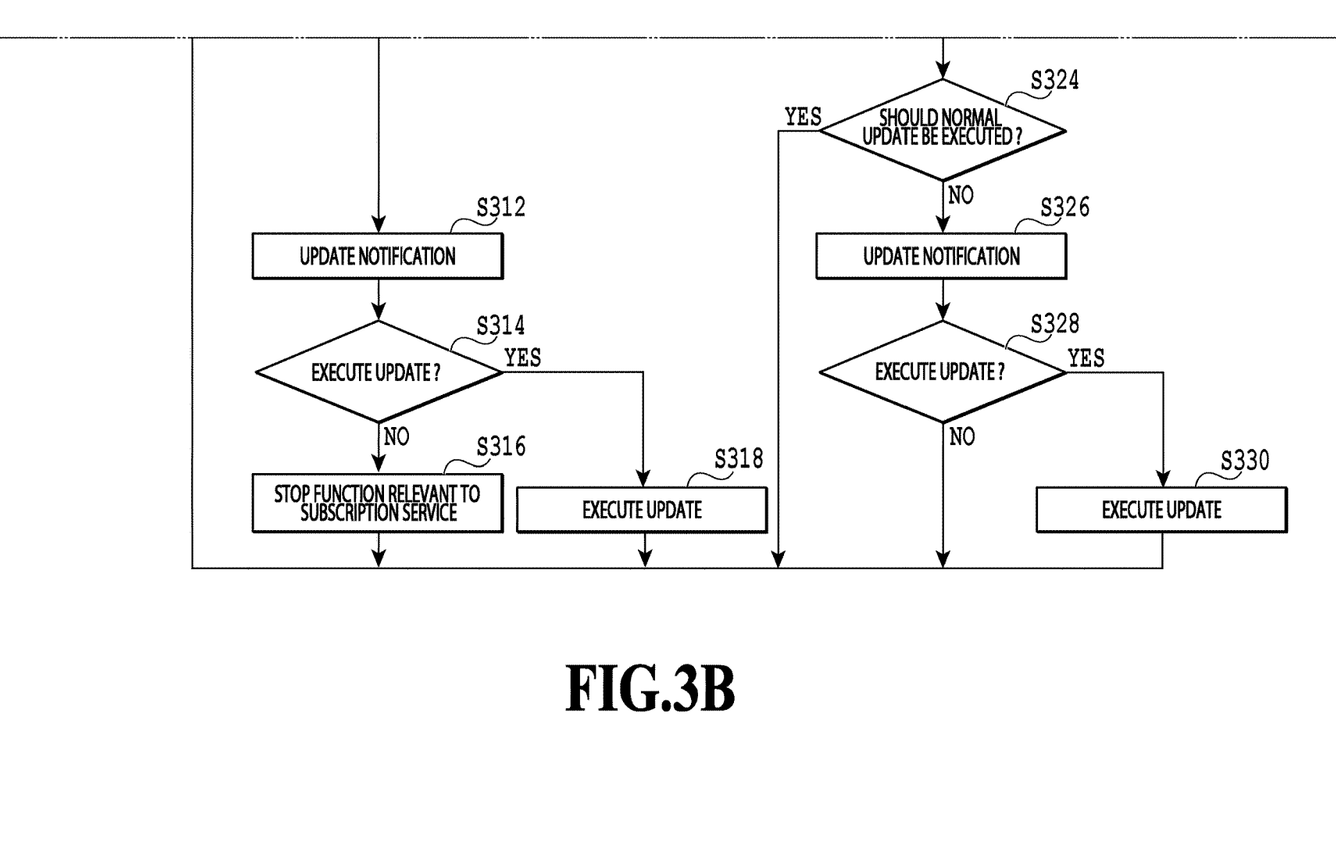

Next, a management process of managing an update of the program in the printing apparatus 16 will be described. FIG. 3 is a flowchart showing the detailed processing contents of the management process of managing an update of the program in the printing apparatus 16. The management process of FIG. 3 is started in the printing apparatus 16 at a predetermined timing such as a timing after the execution of initialization. The procedure shown in the flowchart of FIG. 3 is performed by the CPU 212 loading a program code stored in the program memory 214 into the data memory 216 and executing the program code. Alternatively, part or all of the functions of the steps in FIG. 3 may be executed by hardware such as an ASIC or electric circuit. Incidentally, the sign S in the description of each process indicates a step in the flowchart.

If the management process is started, the CPU 212 first determines in S302 whether a certain period has passed based on an internal clock (not shown) provided in the printing apparatus 16. The certain period is preset information and is stored in a storage area such as the data memory 216. If it is determined in S302 that the certain period has not passed, the process returns to S302. If it is determined in S302 that the certain period has passed, the process proceeds to S304, where the CPU 212 determines whether the subscription service is subscribed. Incidentally, the CPU 212 may be configured to always determine that the certain period has passed in the first determination in S302. This makes it possible to cope with the case where the program was not updated at the time of initialization, for example.

The printing apparatus 16 provided to a user who subscribes the subscription service has received the subscription service sign-up information from the subscription service server 12 at the time of initialization and stores the subscription service sign-up information in a storage area such as the data memory 216. Accordingly, in S304, it is determined whether the subscription service sign-up information is stored. If the subscription service sign-up information is stored, it is determined that the subscription service is subscribed. If the subscription service sign-up information is not stored, it is determined that the subscription service is not subscribed, namely the user does not sign up for the service. As described above, in the present embodiment, the CPU 212 functions as a determination section that determines whether the service is valid.

If it is determined in S304 that the subscription service is subscribed, the process proceeds to S306, where the CPU 212 inquires of the version management server 18 about subscription service version information (described later).

Here, as described above, the version management server 18 stores the latest update data and version information of the program in the printing apparatus 16. The program in the printing apparatus 16 is associated with subscription service version information (hereinafter also referred to as "first version information" as appropriate) and normal version information (hereinafter also referred to as "second version information" as appropriate). These two types of version information are updated according to updates as will be described later.

Thus, if the version management server 18 receives the inquiry about the subscription service version information from the printing apparatus 16, the CPU 202 outputs the latest stored subscription service version information. Incidentally, the version management server 18 also stores the subscription service update data corresponding to the subscription service version information. Accordingly, upon the receipt of the inquiry about the subscription service version information, the version management server 18 may output the subscription service update data corresponding to the version information together with the version information. That is, in this case, the version management server 18 outputs update information including the requested version information and the update data corresponding to the version information. Incidentally, the inquiry sent to the version management server 18 in S306 uses a dedicated communications API or URL and is distinguished from an inquiry about the normal version information (see S320 described later).

In the version management server 18, the subscription service version information is mainly updated in the case of an update for correcting an error that inhibits the subscription service from being provided normally (hereinafter also referred to as "an error relevant to the service"). For example, it is assumed that a user who subscribes the subscription service can get points depending on the use amount of the consumable, the number of sheets printed, or the like in the printing apparatus 16. If an error occurs in a point calculation program, points cannot be properly given to the user, that is, the subscription service cannot be normally provided. Accordingly, in the case of an update for correcting the error in the calculation program, the subscription service version information is updated. The version management server 18 also stores subscription service update data (hereinafter also referred to as "first update data") for an update of the program of the printing apparatus 16 to correct an error that inhibits the subscription service from being provided normally.

In the version management server 18, the normal version information is updated in the case of other updates, for example, an update to correct an error that does not affect the service, such as function enhancement or function correction irrespective of whether it is relevant to the subscription service. The version management server 18 also stores normal update data (hereinafter also referred to as "second update data") for other updates of the program of the printing apparatus 16. Incidentally, an update to correct an error that inhibits the subscription service from being provided normally, that is, an update to normalize the subscription service, is cumulatively included in both of the subscription service update data and the normal update data. In contrast, the other updates are included in the normal update data but are not included in the subscription service update data.

Next, the process proceeds to S308, where the CPU 212 determines whether the subscription service version information has been received from the version management server 18. If it is determined in S308 that the subscription service version information has not been received, the process returns to S308. At this time, if the subscription service version information cannot be acquired even after the elapse of a predetermined period, the user may be notified of error occurrence and the like. If it is determined in S308 that the subscription service version information has been received, the process proceeds to S310, where the CPU 212 determines whether a subscription service update (hereinafter also referred to as "first update") should be executed. More specifically, in S310, it is determined whether the subscription service version information stored in the printing apparatus 16 matches the subscription service version information acquired in S308. That is, in S310, if the two types of subscription service version information match each other, the program in the printing apparatus 16 has been updated to the latest version. Thus, it is determined that the subscription service update should not be executed. In contrast, if the two types of subscription service version information do not match each other, the program in the printing apparatus 16 is yet to be updated to the latest version. Thus, it is determined that the subscription service update should be executed.

As described above, in the present embodiment, the CPU 212 functions as an acquisition section that inquires of the version management server 18 about the version information and acquires the version information from the version management server 18. Further, in the present embodiment, the CPU 212 also functions as an update determination section that determines whether the update should be executed based on the version information stored in the printing apparatus 16 and the version information acquired from the version management server 18.

Figure 4:
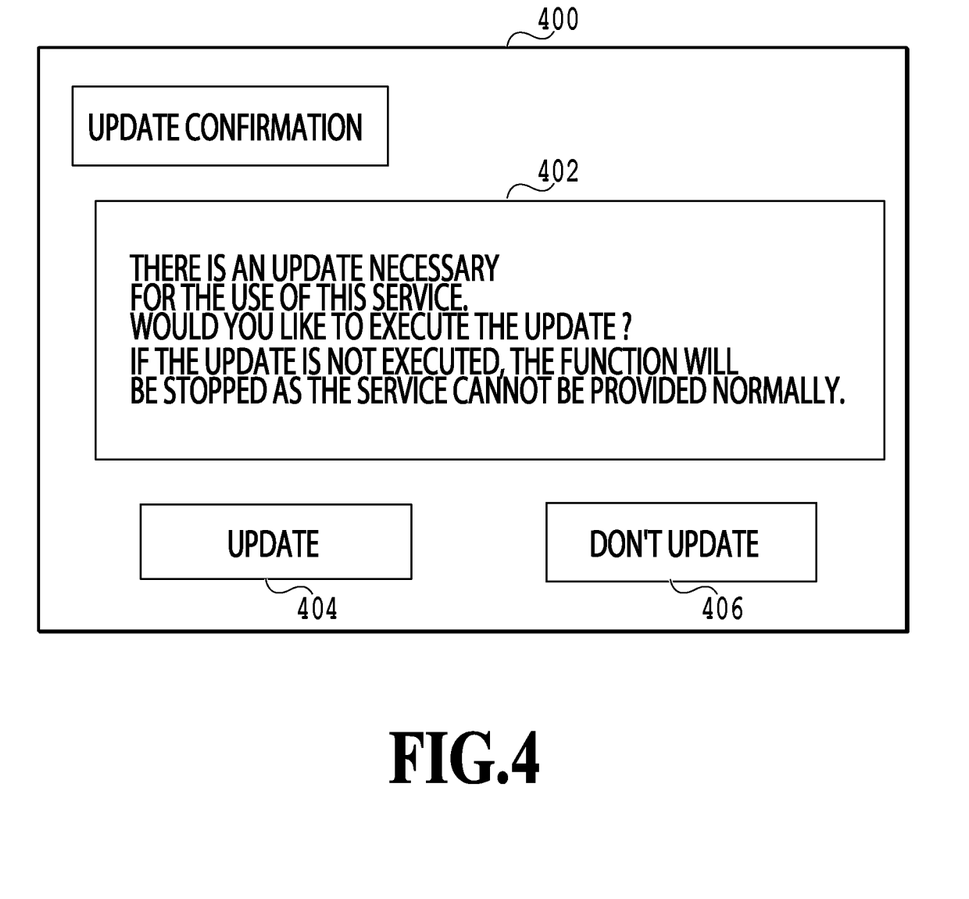
FIG. 4 is a diagram showing an example of a notification screen.

If it is determined in S310 that the subscription service update should be executed, the process proceeds to S312, where the CPU 212 makes an update notification about the subscription service update in the display section 224 via the output interface 226. The update notification is, for example, a notification screen 400 which promotes the update and allows selection of whether to execute the update as shown in FIG. 4. FIG. 4 is a diagram showing an example of the update notification. In the present embodiment, the notification screen 400 promotes the update and makes a notification 402 that the function of the printing apparatus 16 will be stopped if the update is not executed. The notification screen 400 also displays an "update" button 404 to select the execution of the update and a "don't update" button 406 to select the non-execution of the update. As described above, in the present embodiment, the CPU 212, the output interface 226, and the like function as a notification section that makes a notification to allow a user to select whether to update the program.

After that, the CPU 212 determines in S314 whether the execution of the update has been selected. That is, if the "update" button 404 is selected in the notification screen 400, it is determined in S314 that the execution of the update has been selected. If the "don't update" button 406 is selected, it is determined in S314 that the execution of the update has not been selected.

If it is determined in S314 that the execution of the update has not been selected, the process proceeds to S316, where the CPU 212 determines that the printing apparatus 16 will become unable to provide the subscription service normally and stops a function relevant to the subscription service, and the process returns to S302. As the function stopped in S316, it is preferable to stop only a function provided as the subscription service. Thus, in the present embodiment, the printing function is a target to be stopped (regulated). The communication function necessary for a program update, the display function necessary for a user to check the status of the printing apparatus 16, and the like are not set as targets to be stopped. Incidentally, in a case where the printing apparatus 16 is an MFP having the functions of reading, facsimile, and the like and these functions are included in the functions provided by the subscription service, these functions are also made targets to be stopped. As described above, in the present embodiment, the CPU 212 functions as a regulation section that regulates the use of the function provided by the service.

Incidentally, in a case where the function relevant to the subscription service is stopped, a user may be notified that the function relevant to the subscription service has been stopped or notified of the stopped function, for example, via the display section 224. As the method of restarting the stopped function, for example, a user manually updates the program of the printing apparatus 16. Through this process, the CPU 212 confirms that the subscription service version information of the program in the printing apparatus 16 has been updated to the latest one and thus cancels the stop of the function.

In contrast, if it is determined in S314 that the execution of the update has been selected, the process proceeds to S318, where the CPU 212 executes the update and the process returns to S302. Here, if the subscription service update data corresponding to the subscription service version information is acquired from the version management server 18 together with that version information in S308, this update data is used to execute the update in S318. If the above update data is not acquired in S308, a request for the subscription service update data corresponding to the subscription service version information acquired in S308 is sent to the version management server 18 in S318. If the version management server 18 receives the request, the CPU 202 outputs the requested subscription service update data corresponding to the version information to the printing apparatus 16. The printing apparatus 16 acquires the subscription service update data output from the version management server 18 and updates the program based on this update data. Incidentally, in S318, if the update of the program in the printing apparatus 16 is completed, the subscription service version information stored in the storage area of the printing apparatus 16 is updated to the version information corresponding to the update data (namely, acquired in S308).

If it is determined in S304 that the subscription service is not subscribed, or if it is determined in S310 that the subscription service update should not be executed, the process proceeds to S320. In S320, the CPU 212 inquires of the version management server 18 about the normal version information.

If the version management server 18 receives the inquiry about the normal version information from the printing apparatus 16, the CPU 202 outputs the latest stored normal version information. At this time, the normal update data corresponding to the latest normal version information may be output together with that version information.

After inquiring of the version management server 18 about the normal version information, the CPU 212 then determines in S322 whether the normal version information has been acquired. If it is determined in S322 that the normal version information has not been acquired, the process returns to S322. At this time, in a case where the normal version information cannot be acquired even after the elapse of a predetermined period, the user may be notified of error occurrence and the like. If it is determined in S322 that the normal version information has been acquired, the process proceeds to S324, where the CPU 212 determines whether a normal update (hereinafter also referred to as "second update") should be executed. More specifically, it is determined in S324 whether the normal version information stored in the printing apparatus 16 matches the normal version information acquired in S322. That is, in S322, if the two types of normal version information match each other, the program in the printing apparatus 16 has been updated to the latest version. Thus, it is determined that the normal update should not be executed. In contrast, if the two types of normal version information do not match each other, the program in the printing apparatus 16 is yet to be updated to the latest version. Thus, it is determined that the normal update should be executed.

If it is determined in S324 that the normal update should not be executed, the process returns to S302. If it is determined in S324 that the normal update should be executed, the process proceeds to S326, where the CPU 212 makes an update notification about the normal update in the display section 224 via the output interface 226. Although the notification screen 400 is displayed in S326, the notification 402 only promotes the update without notifying that the function of the printing apparatus 16 will be stopped if the update is not executed.

After that, the CPU 212 determines in S328 whether the execution of the update has been selected. If the user selects the "don't update" button 406 in the notification screen 400 and it is determined in S328 that the execution of the update has not been selected, the process returns to S302. In contrast, if the user selects the "update" button 404 in the notification screen 400 and it is determined in S328 that the execution of the update has been selected, the process proceeds to S330, where the CPU 212 executes the update, and the process returns to S302. As described above, if the management process is started, the process subsequent to S304 is executed each time the certain period elapses.

Here, if the normal update data corresponding to the normal version information is acquired from the version management server 18 together with that version information in S322, this update data is used to execute the update in S330. If the above update data is not acquired in S322, a request for the normal update data corresponding to the normal version information acquired in S322 is sent to the version management server 18 in S330. If the version management server 18 receives the request, the CPU 202 outputs the requested normal update data corresponding to the version information to the printing apparatus 16. The printing apparatus 16 acquires the normal update data output from the version management server 18 and updates the program based on this update data. Incidentally, in S330, if the update of the program in the printing apparatus 16 is completed, the normal version information stored in the storage area of the printing apparatus 16 is updated to the version information corresponding to the update data (namely, acquired in S322).

Second Embodiment

Figure 5:
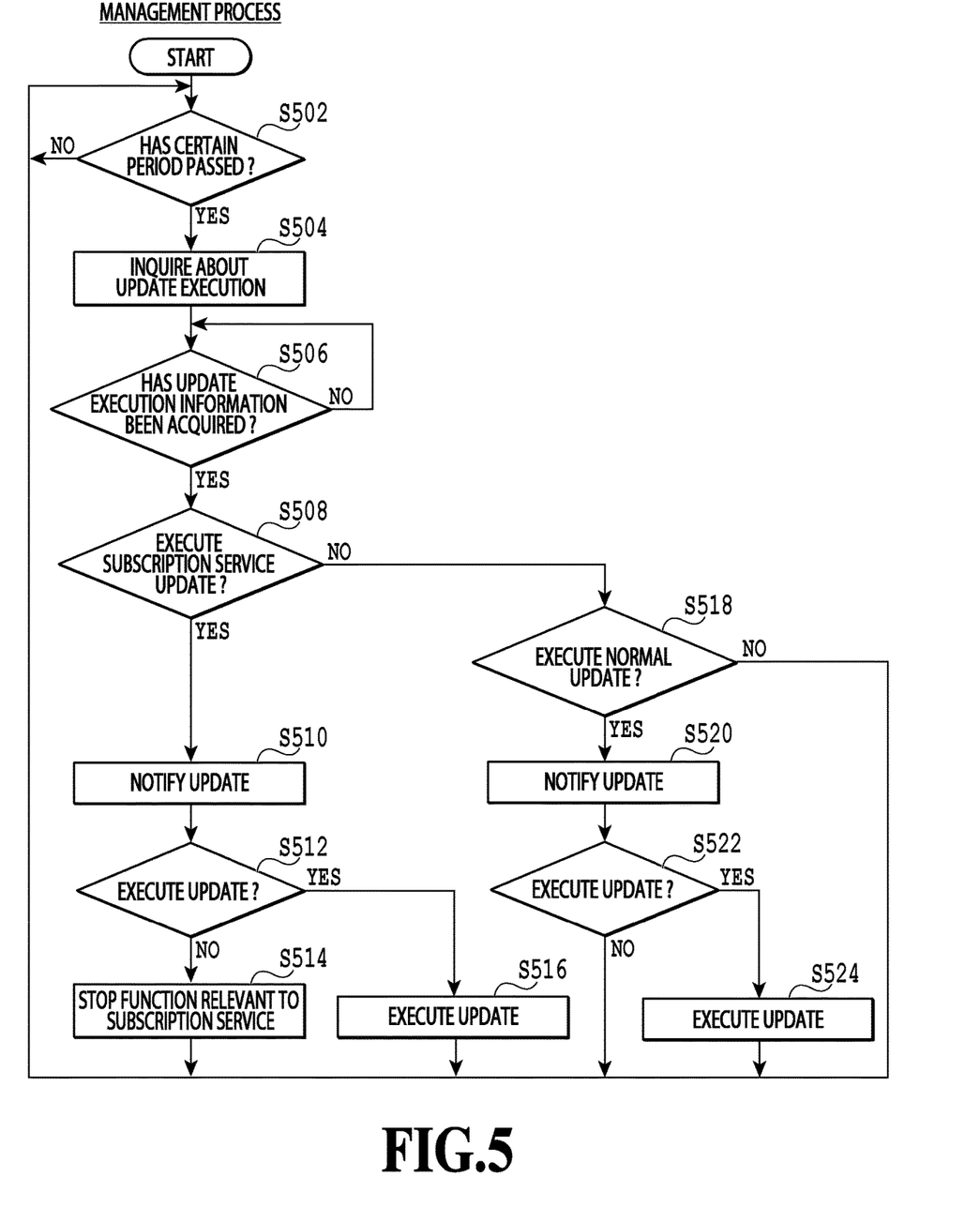
FIG. 5 is a flowchart showing a processing routine of a management process in a second embodiment.
Figure 6:
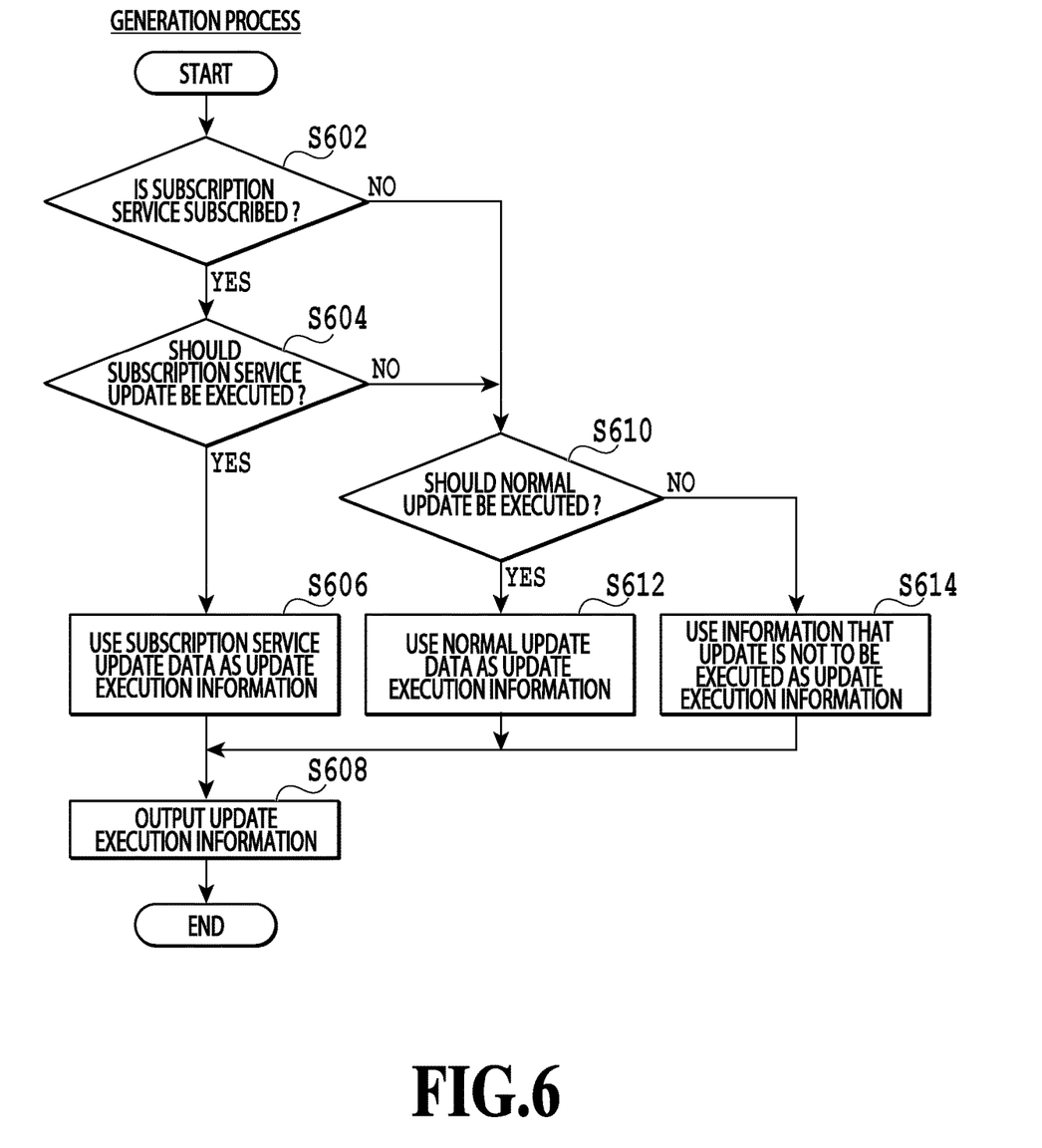
FIG. 6 is a flowchart showing a processing routine of a generation process.

Next, an example of a printing system according to a second embodiment will be described with reference to FIG. 5 and FIG. 6. In the following description, features identical or corresponding to those of the printing system described above in the first embodiment are denoted by the same reference numbers as those used in the first embodiment and the detailed description thereof is omitted.

The second embodiment is different from the first embodiment described above in that the version management server 18 determines whether the version information of the program stored in the printing apparatus 16 is the latest version information. More specifically, based on the information output in the management process of the printing apparatus 16, the version management server 18 performs a generation process of generating update execution information and outputs the update execution information generated in the generation process to the printing apparatus 16 which is executing the management process. The management process executed in the printing apparatus 16 and the generation process executed in the version management server 18 will be described below in detail.

Management Process

First, the management process in the present embodiment will be described. FIG. 5 is a flowchart showing the detailed processing contents of the management process executed in the printing apparatus 16 in the second embodiment. Like the management process of FIG. 3, the management process of FIG. 5 is also started at a predetermined timing such as a timing after the execution of initialization of the printing apparatus 16. The procedure shown in the flowchart of FIG. 5 is performed by the CPU 212 loading a program code stored in the program memory 214 into the data memory 216 and executing the program code. Alternatively, part or all of the functions of the steps in FIG. 5 may be executed by hardware such as an ASIC or electric circuit.

If the management process is started, the CPU 212 first determines in S502 whether a certain period has passed. A specific processing content of S502 is identical to that of S302. If it is determined in S502 that the certain period has passed, the process proceeds to S504, where the CPU 212 inquires of the version management server 18 about the execution of an update of the program of the printing apparatus 16. In the inquiry of S504, the printing apparatus 16 outputs the subscription service sign-up information and the version information of the program. The output version information includes the subscription service version information and the normal version information of the program in the printing apparatus 16 stored in the storage area. If there is no subscription service sign-up information, the information cannot be output. As described above, in the present embodiment, the CPU 212 functions as an inquiry section that outputs the subscription service sign-up information, the subscription service version information, and the normal version information to the version management server 18 and inquires about the execution of an update.

If the inquiry is sent to the version management server 18, it is then determined in S506 whether update execution information has been acquired. In response to the inquiry in S504, the version management server 18 starts a generation process (described later) for generating the update execution information. The generated update execution information is output from the version management server 18 to the printing apparatus 16. Accordingly, it is determined in S506 whether the update execution information output from the version management server 18 has been acquired. As described above, in the present embodiment, the CPU 212 functions as an acquisition section that acquires the update execution information (described later) including the update information and the like.

If it is determined in S506 that the update execution information has not been acquired, the process returns to S506. At this time, in a case where the update execution information cannot be acquired even after the elapse of a predetermined period, the user may be notified of error occurrence and the like. If it is determined in S506 that the update execution information has been acquired, the process proceeds to S508, where the CPU 212 determines whether the subscription service update is to be executed.

Here, as will be described later, the update execution information is the subscription service update data, the normal update data, or information that the update is not to be executed. Accordingly, it is determined in S508 whether the acquired update execution information is the subscription service update data. If it is determined in S508 that the acquired update execution information is the subscription service update data, it is determined that the subscription service update is to be executed. If the acquired update execution information is not the subscription service update data, it is determined that the subscription service update is not to be executed.

If it is determined in S508 that the subscription service update is to be executed, the CPU 212 makes the update notification in S510 and determines in S512 whether the execution of the update has been selected. If it is determined in S512 that the execution of the update has not been selected, the CPU 212 stops the function relevant to the subscription service in S514 and the process returns to S502. Since specific processing contents of S510 to S514 are identical to those of S312 to S316 described above, the detailed description thereof is omitted. If it is determined in S512 that the execution of the update has been selected, the CPU 212 executes the update in S516 based on the subscription service update data, which is the update execution information, and the process returns to S502.

In contrast, if it is determined in 508 that the subscription service update is not to be executed, the CPU 212 determines in S518 whether a normal update is to be executed. In S518, it is determined whether the acquired update execution information is the normal update data. If the acquired update execution information is the normal update data, it is determined in S518 that the normal update is to be executed. If the acquired update execution information is not the normal update data, it is determined that the normal update is not to be executed.

If it is determined in S518 that the normal update is not to be executed, the process returns to S502. If it is determined in S518 that the normal update is to be executed, the CPU 212 makes the update notification in S520 and determines in S522 whether the execution of the update has been selected. If it is determined in S522 that the execution of the update has not been selected, the process returns to S502. Since specific processing contents of S520 and S522 are identical to those of S326 and S328 described above, the detailed description thereof is omitted. If it is determined in S522 that the execution of the update has been selected, the CPU 212 executes the update in S524 based on the normal update data, which is the update execution information, and the process returns to S502.

Generation Process

Next, the generation process of generating the update execution information executed in the version management server 18 will be described. FIG. 6 is a flowchart showing the detailed processing contents of the generation process of generating the update execution information. The generation process of FIG. 6 is started if the version management server 18 receives the inquiry about the execution of the update to the program of the printing apparatus 16. The procedure shown in the flowchart of FIG. 6 is performed by the CPU 202 loading a program code stored in the ROM 204 into the RAM 206 and executing the program code. Alternatively, part or all of the functions of the steps in FIG. 6 may be executed by hardware such as an ASIC or electric circuit. In the present embodiment, the CPU 202 functions as a receiving section that receives the subscription service sign-up information, the subscription service version information, and the normal version information from the printing apparatus 16 together with the inquiry about the update execution.

If the generation process is started, the CPU 202 first determines in S602 whether the subscription service is subscribed. In S602, it is determined whether the subscription service sign-up information output from the printing apparatus 16 has been acquired together with the inquiry from the printing apparatus 16. Accordingly, if the subscription service sign-up information has been acquired, it is determined in S602 that the subscription service is subscribed. If the subscription service sign-up information has not been acquired, it is determined that the subscription service is not subscribed. As described above, in the present embodiment, the CPU 202 functions as a determination section that determines whether the service is valid.

If it is determined in S602 that the subscription service is subscribed, the process proceeds to S604, where the CPU 202 determines whether the subscription service update should be executed. In S604, it is determined whether the latest subscription service version information stored in the version management server 18 matches the subscription service version information acquired from the printing apparatus 16. That is, in S604, if the two types of subscription service version information match each other, it is determined that the program of the printing apparatus 16 is in the latest version. Thus, it is determined that the subscription service update should not be executed. If the two types of subscription service version information do not match each other, it is determined that the program of the printing apparatus 16 is not in the latest version. Thus, it is determined that the subscription service update should be executed. As described above, in the present embodiment, the CPU 202 functions as an update determination section that determines whether the program update should be executed based on the version information output from the printing apparatus 16 and the version information stored in the version management server 18.

If it is determined in S604 that the subscription service update should be executed, the process proceeds to S606, where the CPU 202 generates the update execution information by using the subscription service update data as the update execution information. After that, in S608, the CPU 202 outputs the generated update execution information to the printing apparatus 16 and finishes the generation process.

If it is determined in S602 that the subscription service is not subscribed, or if it is determined in S604 that the subscription service update should not be executed, the process proceeds to S610. The CPU 202 determines in S610 whether the normal update should be executed. In S610, it is determined whether the latest normal version information stored in the version management server 18 matches the normal version information acquired from the printing apparatus 16. That is, in S610, if the two types of normal version information match each other, it is determined that the program of the printing apparatus 16 is in the latest version. Thus, it is determined that the normal update should not be executed. If the two types of normal version information do not match each other, it is determined that the program of the printing apparatus 16 is not in the latest version. Thus, it is determined that the normal update should be executed.

If it is determined in S610 that the normal update should be executed, the process proceeds to S612, where the CPU 202 generates the update execution information by using the normal update data as the update execution information, and the process proceeds to S608. If it is determined in S610 that the normal update should not be executed, the process proceeds to S614, where information that the update is not to be executed is generated as the update execution information, and the process proceeds to S608. Incidentally, the information in S614 may be any information other than the subscription service update data and the normal update data.

As described above, in the generation process, if the inquiry is sent from the printing apparatus 16, the subscription service sign-up information, the subscription service version information, and the normal version information are used for different determination processes. Thus, the version management server 18 may request each information from the printing apparatus 16 and acquire the information at the timing when the information is necessary.

Advantageous Effect of Each Embodiment

As described above, the subscription service version information is updated in the case of an update to correct an error that inhibits the subscription service from being provided normally, and the normal version information is updated in the case of other updates. If the subscription service is subscribed, it is first determined whether the update is necessary based on the subscription service version information. If it is determined that the update is not necessary, it is determined whether the update is necessary based on the normal version information. On the other hand, if the subscription service is not subscribed, it is determined whether the update is necessary only based on the normal version information.

As a result, in the printing apparatus 16 used by a user who subscribes the subscription service, high priority can be given to the subscription service update. Further, in the printing apparatus 16 used by a user who does not subscribe the subscription service, even if there is a subscription service update, the notification screen 400 for that update is prevented from being displayed. Therefore, the program of the printing apparatus 16 can be updated without decreasing user convenience regardless of whether the subscription service is subscribed.

Other Embodiments

The above embodiments may be modified as shown in (1) to (6) below.
(1) In the above embodiments, the printing system 10 comprises the two servers, the subscription service server 12 and the version management server 18. However, the server configuration is not limited to this. For example, a single server having the functions of the subscription service server 12 and version management server 18 may be connected to the printing apparatus 16 via the network 14.
(2) In the above embodiments, the provided service is only the subscription service. However, if possible, a plurality of services using the functions of the printing apparatus 16 may be provided. In this case, version information for the program is prepared for each of the provided services such that the function is stopped until the update is executed as in the case of the subscription service.
(3) In the above embodiments, whether the update should be executed is determined based on the version information. However, the information for use in the determination is not limited to this and may be any information as long as it can be used to determine that the update should be executed. Further, in the above embodiments, the update of the subscription service version information is executed to correct an error that inhibits the subscription service from being provided normally. However, the update is not limited to this and may be executed to correct an error in a program that performs a specific process for providing the service.
(4) Although not particularly described in the above embodiments, the printing apparatus 16 may be configured such that a user can use its function via a device (not shown).
(5) In the above embodiments, the printing system which allows the use of the printing function of the printing apparatus under an agreement is described as an example. However, the technique of this disclosure is also applicable to a publicly-known communication system which allows the use of a predetermined function of a communication apparatus under an agreement. Examples of the communication apparatus include a reading apparatus, a copying apparatus, a facsimile apparatus, and an apparatus having the combination of the functions of these apparatuses.
(6) The above embodiments and the modifications shown in (1) to (5) above may be combined as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-012000, filed Jan. 30, 2023, which is hereby incorporated by reference wherein in its entirety.

What is claimed is:

1. A communication apparatus capable of providing a specific function as a service according to an agreement, the communication apparatus comprising:
   one or more processors that, by executing instructions stored in one or more memories, function as:
      an acquisition unit configured to acquire, from a server, first information about an update for correcting an error in a program;
      an update unit configured to update the program based on the information about the update; and
      a regulation unit configured to regulate use of functions in the communication apparatus,
   wherein the regulation unit
      regulates the use of the specific function in a case where the information about the update acquired by the acquisition unit is first information about an update to correct an error relevant to provision of the service and the update is not executed by the update unit based on the first information, and
      does not regulate the use of the specific function in a case where the information about the update acquired by the acquisition unit is second information about an update to correct an error irrelevant to the provision of the service and the update is not executed by the update unit based on the second information.

2. The communication apparatus according to claim 1, wherein
   the acquisition unit acquires the first information from the server in a case where the service is valid and acquires the second information from the server in a case where the service is invalid.

3. The communication apparatus according to claim 2, wherein the one or more processors further execute instructions stored in the one or more memories to function as a determination unit configured to determine whether the service is valid based on sign-up information for the service.

4. The communication apparatus according to claim 1, wherein the one or more processors further execute instructions stored in the one or more memories to function as an update determination unit configured to determine whether the update should be executed,
   wherein the first information includes first version information which is updated in a case where the update is executed based on the first information, and
   the update determination unit determines whether the update should be executed based on the first information, based on the first version information acquired by the acquisition unit and the first version information stored in the communication apparatus.

5. The communication apparatus according to claim 4, wherein the one or more processors further execute instructions stored in the one or more memories to function as a notification unit configured to make a notification to allow selection of whether to execute the update based on the first information, in a case where it is determined by the update determination unit that the update should be executed based on the first information,
   wherein the regulation unit regulates the use of the specific function in a case where non-execution of the update based on the first information is selected in the notification made by the notification unit.

6. The communication apparatus according to claim 2, wherein the one or more processors further execute instructions stored in the one or more memories to function as an output unit configured to output, to the server, sign-up information for the service and first version information that is stored in the communication apparatus and updated in a case where the update is executed based on the first information,
   wherein the server determines whether the service is valid based on the sign-up information for the service,
   in a case where the service is valid, the server determines whether the update should be executed based on the first information, based on the first version information stored in the server and the first version information output from the communication apparatus, and
   in a case where it is determined that the update should be executed based on the first information, the server outputs the first information.

7. The communication apparatus according to claim 6, wherein
   the output unit further outputs, to the server, second version information which is updated in a case where the update is executed based on the second information,
   in a case where the service is invalid, the server determines whether the update should be executed based on the second information, based on the second version information stored in the server and the second version information output from the communication apparatus, and
   in a case where it is determined that the update should be executed based on the second information, the server outputs the second information.

8. The communication apparatus according to claim 6, wherein the one or more processors further execute instructions stored in the one or more memories to function as a notification unit configured to make a notification to allow selection of whether to execute the update based on the first information in a case where the acquisition unit acquires the first information, wherein the regulation unit regulates the use of the specific function in a case where non-execution of the update based on the first information is selected in the notification made by the notification unit.

9. The communication apparatus according to claim 1, wherein
the function includes at least one of a printing function, a reading function, a copying function, and a facsimile function.

10. The communication apparatus according to claim 1, wherein
the update based on the first information and the update based on the second information are not executed in a case where the update based on the first information and the update based on the second information are cancelled by a user instruction.

11. A control method of a communication apparatus capable of providing a specific function as a service according to an agreement, the control method comprising:
an acquisition step of acquiring, from a server, information about an update for correcting an error in a program;
an update step of updating the program based on the information about the update; and
a regulation step of regulating use of a function provided in the communication apparatus,
wherein in the regulation step,
the use of the specific function is regulated in a case where the information about the update acquired in the acquisition step is first information about an update to correct an error relevant to provision of the service and the update is not executed based on the first information in the update step and
the use of the specific function is not regulated in a case where the information about the update acquired in the acquisition step is second information about an update to correct an error irrelevant to provision of the service and the update is not executed based on the second information in the update step.

12. A non-transitory computer readable storage medium storing a program for causing a computer to perform a control method of a communication apparatus capable of providing a specific function as a service according to an agreement, the control method comprising:
an acquisition step of acquiring, from a server, information about an update for correcting an error in a program;
an update step of updating the program based on the information about the update; and
a regulation step of regulating use of a function provided in the communication apparatus,
wherein in the regulation step,
the use of the specific function is regulated in a case where the information about the update acquired in the acquisition step is first information about an update to correct an error relevant to provision of the service and the update is not executed based on the first information in the update step and
the use of the specific function is not regulated in a case where the information about the update acquired in the acquisition step is second information about an update to correct an error irrelevant to provision of the service and the update is not executed based on the second information in the update step.

* * * * *